350-397 SR CROSS REFERENCE SEARCH ROOM
XR 2,868,075
Jan. 13, 1959 C. F. BIVENS 2,868,075
OPTICAL LENSES
Filed Oct. 23, 1953
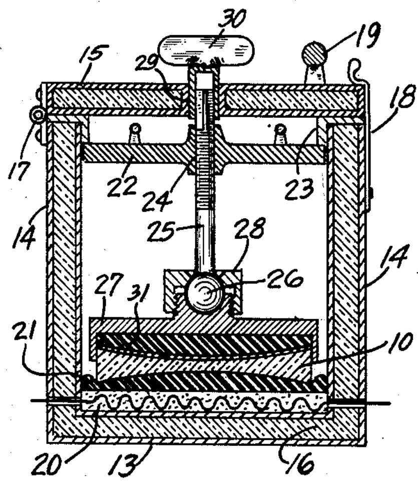
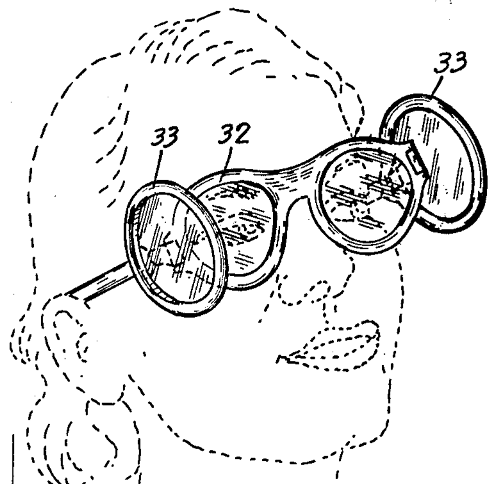
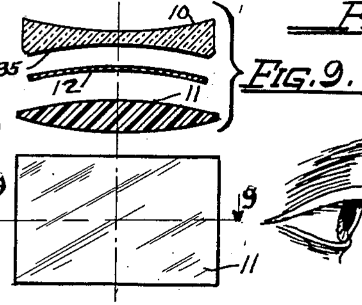
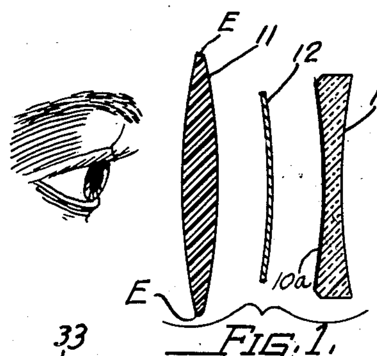
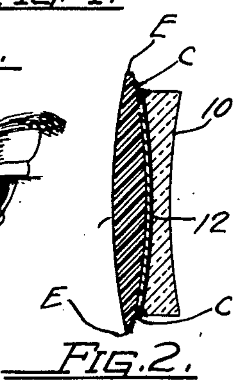
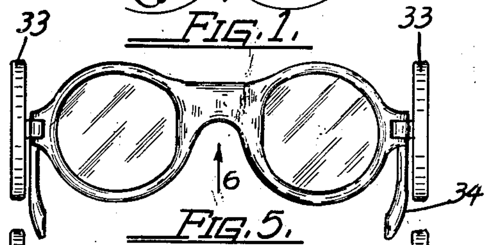
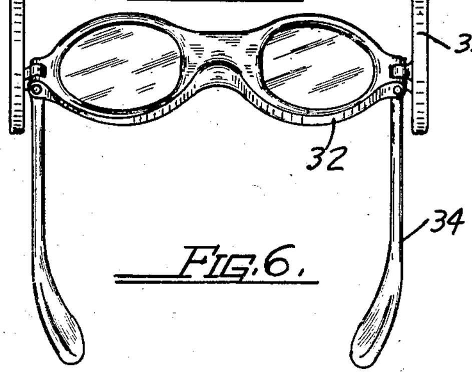
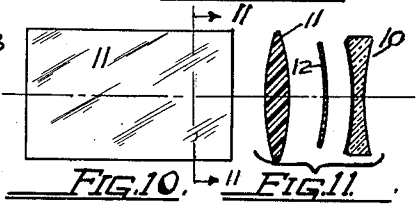
INVENTOR.
Carl F. Bivens
BY
Martin E. Anderson
ATTORNEY United States Patent Office 2,868,075 Patented Jan. 13, 1959

2,868,075

OPTICAL LENSES

Carl F. Bivens, Denver, Colo.

Application October 23, 1953, Serial No. 387,911

1 Claim. (Cl. 88—54)

This invention relates to improvements in optical lenses more particularly to lenses such as are used for reading and for the clarification and magnification of television pictures but which may also be employed for spectacles and other uses.

Lenses are primarily made from optical glass and ground to certain specifications. Lenses are planar, plano-convex, plano-concave, or double convex or double concave, and may be so ground as to have spherical or cylindrical surfaces and may be simple or compound.

The ordinary lenses, and especially those that are employed for spectacles are simple lenses having a combination of cylindrical and spherical surfaces which may be either concave or convex and are ground to prescriptions furnished by optometrists. Such lenses are a great help but often produce objectionable reflections that interfere with the vision.

It is the principal object of this invention to produce a compound lens formed from glass and plastic elements assembled into a unit and connected in a manner to which attention will be called as the description proceeds, to form a lens unit that will not produce any appreciable glare and which will be free from ultra violet rays.

Such lenses are easy on the eyes and prevent, to a great extent, eye fatigue when worn in strong light, such as sunlight, which contains rays that are not essential to sight but which are useful for other purposes.

No attempt will be made to make this a treatise on optics, but the specification will be limited to the explanation of the lens construction, the method of forming the same, and to an explanation of some of the principal uses, for which purpose reference will now be had to the accompanying drawing in which Figure 1 is an exploded cross sectional view showing the several parts of a compound lens made in accordance with this invention, the sections represent diametrical sections of spherical lenses and sections perpendicular to the axis of curvature of cylindrical lenses;

Figure 2 is a sectional view showing the several lens elements in assembled relation;

Figure 3 is a cross sectional view of an apparatus employed in assembling the lenses;

Figure 4 shows the lens embodied in a pair of spectacles and shows also their relationship to the face of the wearer;

Figure 5 is a front elevational view of the spectacles in Figure 4;

Figure 6 is a view looking downwardly or in the direction of arrow 6 in Figure 5;

Figure 7 is a side elevational view looking upwardly in Figure 5;

Figure 8 is a side elevational view of a rectangular lens looking towards the right in Figure 2;

Figure 9 is a section taken on line 9—9 Figure 8 and shows the several lenses separated as in Figure 1;

Figure 10 is a view similar to that shown in Figure 8; and

Figure 11 is a section taken on line 11—11 Figure 10 and shows the several lenses separated as in Figure 1.

Referring now to the drawing, reference numeral 10 designates a double concave lens of optical glass which may be found spherically or cylindrically. Reference numeral 11 represents a double convex lens, preferably made from some transparent synthetic plastic such as diglycol carbonate. Reference numeral 12 represents a thin sheet of cellulose acetate.

The three elements 10, 11 and 12 are assembled as shown in Figure 2 with the cellulose acetate 12 non-adhesively held in place between the two lenses 10 and 11 which now forms a compound lens. In the example shown, the concavity of lens element 10 is the same as the convexity of lens element 11 so that, if lenses 10 and 11 have the same refractive index, the compound lens would be equivalent to a planar lens with parallel sides since the acetate sheet 12 has parallel sides and is optically inert to effect refraction.

If and when a cement is used for polarizing or adhesive purposes the three optical elements are assembled in a manner that will now be described and preferably by the use of the apparatus shown in Figure 3, or its equivalent, which shows a box, either round or oblong, whose bottom has been designated by reference numeral 13, the sides by numeral 14, and the removable top by numeral 15. The bottom, sides and top have been shown as formed from spaced sheets of metal, separated by a spacer 16 of heat insulating material. The cover may be hinged along one side as indicated by 17, and held in closed position by means of a clasp 18. A handle has been shown at 19. Resting on the bottom is an electric heating element 20, and resting on this is a resilient cushion 21 of heat resisting material such as flexible rubber. A removable bar 22 extends across the box with its ends underneath projections 23 and is provided with a threaded opening 24 which receives and cooperates with bolt 25, whose lower end terminates in a ball 26 that is secured to pressure plate 27 by means of a removable cap 28. The cover has a central opening 29 into which the squared upper end of bolt 25 extends. A removable key 30 connects with the squared end of the bolt as shown, and serves to turn the bolt. Attached to the under surface of the pressure plate is a cushion 31 of the same material as cushion 21, both of these cushions are preferably provided with opposed convex surfaces as shown.

The lens elements are assembled by first placing the glass lens 10 upon cushion 21 and brushing or spraying an optical cement on the upper lens surface. Two sheets 12 and **12*a* (not shown) of cellulose acetate of different thicknesses are then placed on the cement surface 10*a* of lens 10 with the thinner 12 in engagement with the cement. If heat is required for the cement the heating unit 20 can now be turned on, but excessive heat will disfigure the acetate sheets 12 and 12*a*. The thicker top sheet 12*a* is then pressed down first at the center and the pressure moved outwardly so as to remove any air bubbles. After sheet 12 has been pressed down into air free contact with lens 10 the assembly comprising cushion 31, holder 27, and associated parts, are positioned as shown in Figure 3. The cover is closed and screw 25 is turned to force cushion 31 into form contact with the surface of the top sheet and left in this manner until the cement becomes hard. After the cement has become hard, the lens 10 and acetate sheets 12 and 12*a* are released from the compress and the upper acetate sheet 12*a* is removed leaving the lower sheet 12 adhesively attached to lens 10 for optical purposes. Lens 11 is positioned on sheet 12 as shown in Figure 2. Lens 11 is secured to lens 10** by means of some suitable cement C which is applied about the edges after lenses 10 and 11 and acetate sheet 12 have again been placed in the compress and slight pressure applied and thus left to solidify. If desired, the outer surface of lens 11 can be coated with a resinous coating which gives a hard smooth surface that resists scratching.

It will be observed that lens 11 projects beyond lens 10 providing an edge E that serves to fit into a receiving groove in an encircling frame, such as the spectacle frame 32 shown in Figures 4 to 7.

When assembled for spectacles, the lenses are positioned in ordinary spectacle frames as shown in Figures 4 to 7 inclusive. In order to reduce reflections produced by rays of light entering from the side, lenses similar to those described are enclosed in frames 33 and attached to the bows so as to project about half of their width to the front of the regular lenses as shown in Figures 4, 6 and 7. The side lenses 33 prevent light from the sides and rear to strike the spectacle lenses to produce objectionable reflections and as a result the eyes are subjected to less glare and strain.

Reading lenses are preferably made rectangular and are ground as cylinders, which, when the cylindrical surface is a plus cylinder, lengthens the letters in an up and down direction. For long periods of reading the lens should be constructed as shown in Figure 10.

Larger lenses can be used to enlarge and clarify television pictures and such lenses are ground as cylinders with the axis vertical.

Optical cement forms a polarizing agent to some extent when used between the glass lens 10 and the acetate 12 and reduces to some extent the glare of glass lens 10. Some of the cements which possess transparent qualities and can be used between lens 10 and acetate 12 in an adhesive manner are compounds such as vinyl acetate, abietic acid, as well as urea compounds and aldehyde-phenol compounds such as hexamethylene-phenol. Any adhesive cement mentioned above which is used in this manner will produce slight optical illusions and is not as satisfactory as the two lenses 10 and 11 and the acetate member 12, when they are used without optical cement. When cleaning these lenses, water above warm should not be used if it will weaken or disfigure the cements used or the acetate 12, but a suitable chemical vapor sterilizer or chemical sterilizing should be used for this purpose at low temperatures.

Where the index of refraction is of no great importance, the cement "peperine" is sometimes used to effect adherence between two glass lenses and gives excellent results. This cement, when it is to be used in lenses that transmit light, must be heated for a long time and/or at a temperature higher than the melting temperature. It melts and does not crystallize but forms an elastic, nonfrangible, clear, transparent cement.

Uncoated lenses have a considerable reflection loss which is dependent on the type of glass and the kind of light employed. Some glass such as flint glass transmits only 88% of the incident rays and Crown glass transmits approximately 90% of the incident rays.

The losses due to reflection can be greatly reduced by coating the air contacting surfaces with one of the several approved coatings commonly employed for this purpose.

Solutions that may be employed for reducing reflection losses include such as are formed of nitric, acetic, boric and phosphoric acids, also various sulphates such as copper, nickel and iron. Since no novelty is claimed in the method of coating this will not be further described.

The cellulose acetate sheet 12 when treated to form a polarizing member against strong light and the glare of glass lens 10 in combination further improves the optical characteristics of the glass lens 10 and plastic lens 11.

Colors can be used in these lens units for commercial and other purposes, and especially in the glass lens 10 and the acetate sheet 12.

It is understood that the lenses may be of any desired shape; when used in spectacle frames they will, of course, be shaped to fit the frame. When employed as a hand glass for reading, in a manner common to the usual reading glasses, the lenses are preferably square or oblong rectangles as indicated in Figures 8 and 10, which are views looking towards the right in Figure 2 with the plastic lens nearest the eye. In Figure 8 the axis of curvature of the cylindrical surfaces is vertical and perpendicular to the longitudinal axis while in Figure 10 the axis of curvature is horizontal and parallel with the longitudinal axis.

Attention is directed at this point to the fact that since the cellulose acetate has a co-efficient of expansion that differs greatly from that of the glass lens, it is desirable to keep the cement at C out of contact with the acetate spacer so that it will permit free expansion of the acetate sheet which must fit snugly in the space between the lenses.

For cylinder ground lenses for visual use the axis of curvature is always vertical when employed in connection with television and moving picture screens when a cloth or other screen is placed behind it.

This application is a continuation in part of application Serial Number 383,799, filed October 2, 1953, and now abandoned.

To avoid internal damage to lens elements a calking is used between lenses 10 and 11 at their edges only, and before cement C is applied. For this purpose elastic rubber or plastic ring bands or wraps of fabric thread, etc. are used and one edge of the lens pointed vertical so that excess cement will not drain externally onto the lens faces to mar them.

What is claimed as new is:

A compound lens comprising a glass lens element; a plastic lens element formed to mate with one face of the glass lens element; a polarizing element comprising a relatively thin layer of treated cellulose acetate adhesively attached to said glass lens element and means for securing the glass lens, attached polarizing element and plastic lens in assembled relation comprising an adhesive bond applied solely to the edges of the lenses with said bond being spaced from the edges of the polarizing element.

References Cited in the file of this patent

UNITED STATES PATENTS

| | | |
|---|---|---|
| 1,182,739 | Benedictus | May 9, 1916 |
| 1,230,136 | Draper | June 19, 1917 |
| 1,304,421 | Wachter | May 20, 1919 |
| 1,918,999 | Wells | July 18, 1933 |
| 2,033,101 | Tillyer et al. | Mar. 3, 1936 |
| 2,060,104 | Moulton | Nov. 10, 1936 |
| 2,320,375 | Moulton | June 1, 1943 |
| 2,330,663 | Bennett et al. | Sept. 28, 1943 |
| 2,727,843 | Tillyer | Dec. 20, 1955 |